Patented Jan. 6, 1953

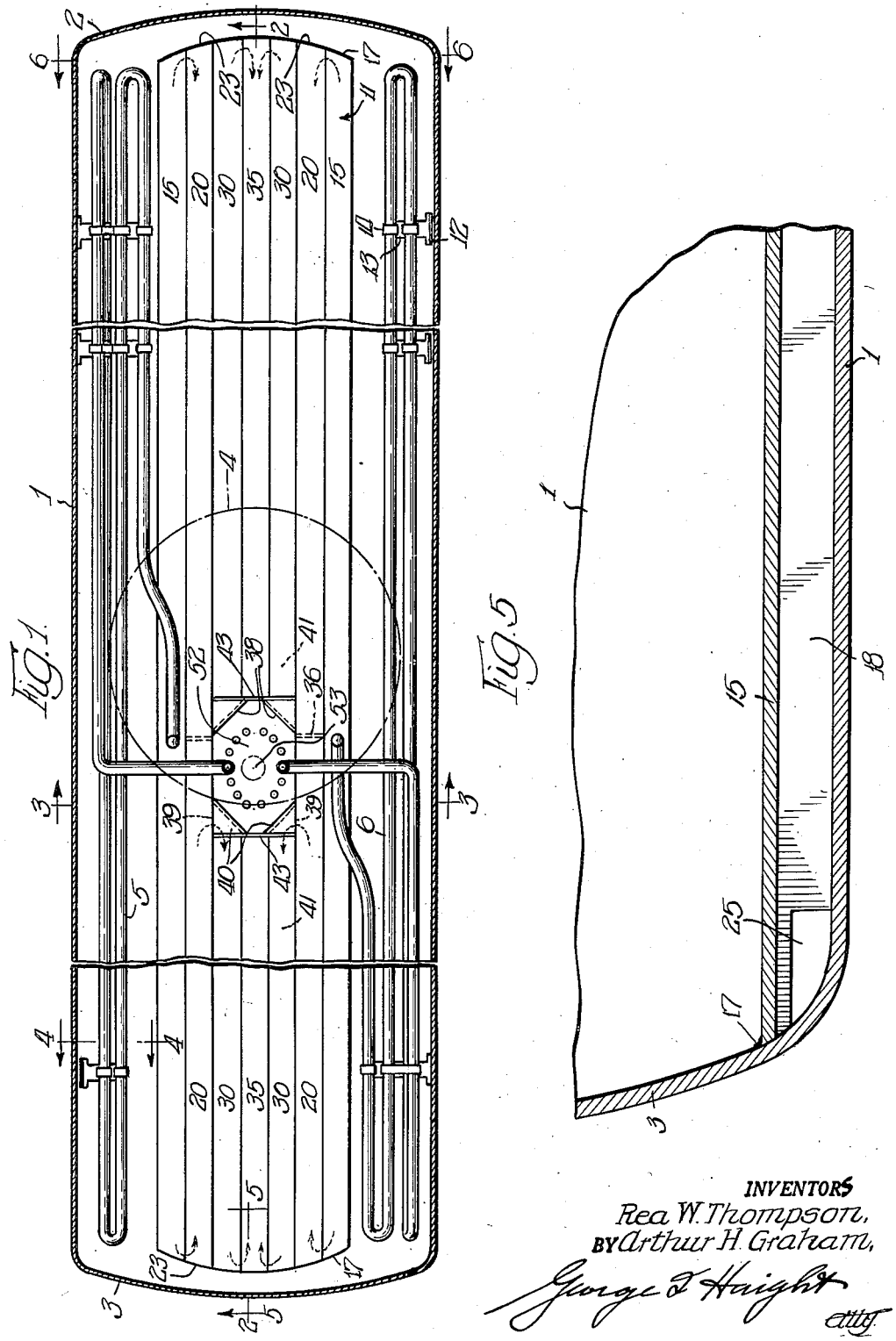

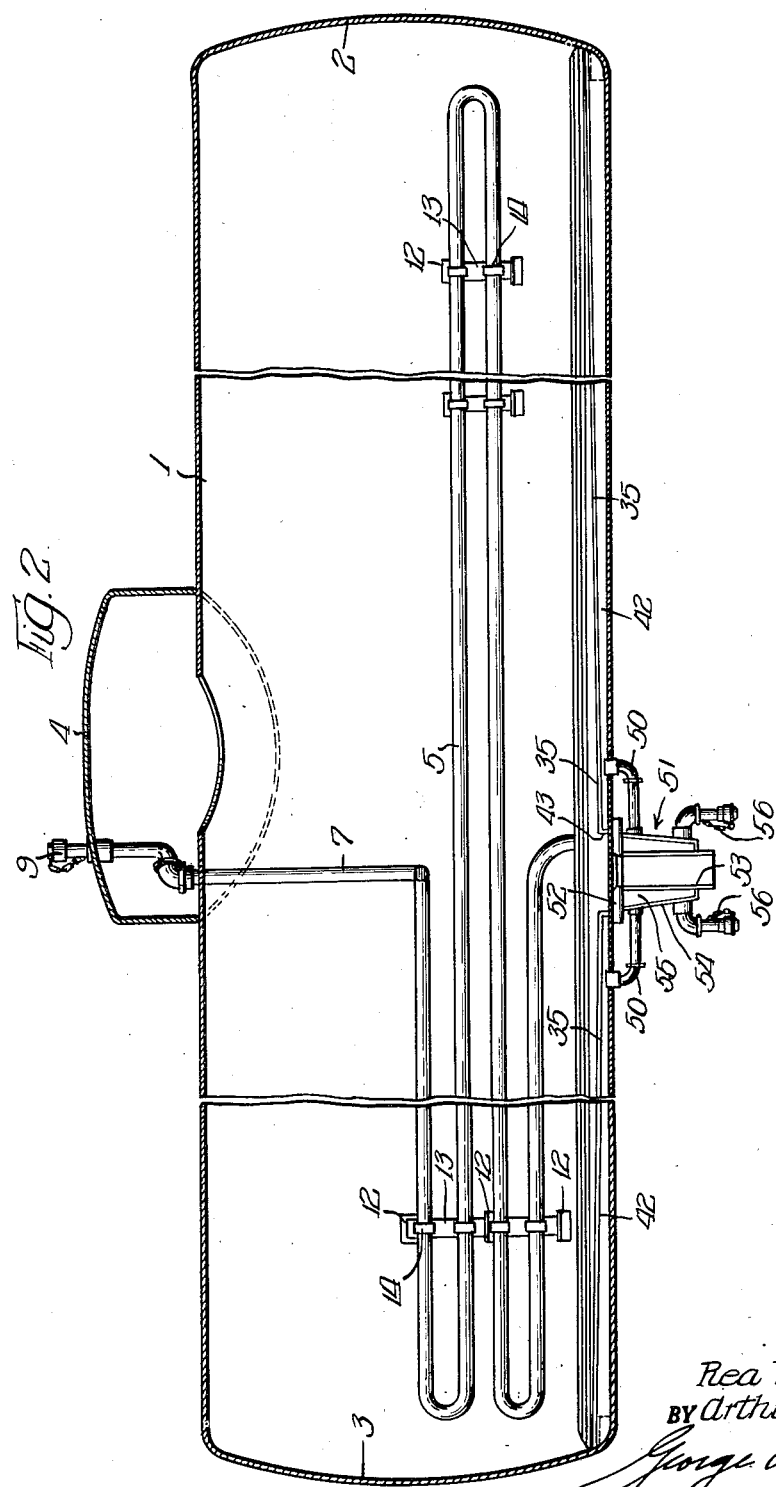

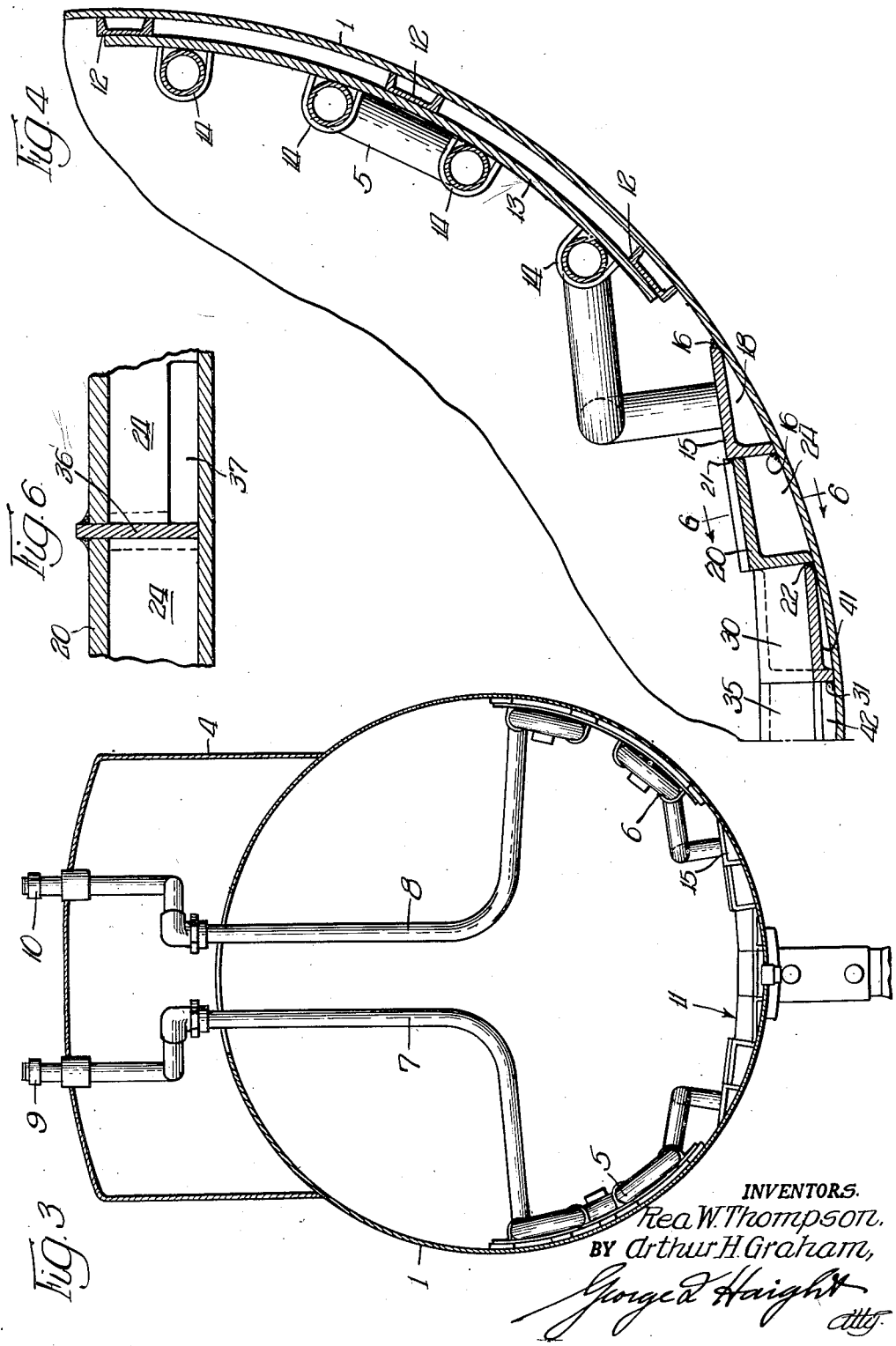

2,624,553

UNITED STATES PATENT OFFICE 2,624,553

HEATING SYSTEM FOR TANKS

Rea W. Thompson, Gary, Ind., and Arthur H. Graham, Sharon, Pa., assignors to General American Transportation Corporation, Chicago, Ill., a corporation of New York Application January 21, 1948, Serial No. 3,434

6 Claims. (Cl. 257—198)

This invention relates to heating systems for tanks and has for its principal object the provision of a new and improved system of this kind.

It is the main object of the invention to provide a heating system for tanks that will efficiently heat the contents thereof to facilitate emptying the tank.

Another object of the invention is to provide a heating system that includes a hot plate disposed in juxtaposition to the bottom of the tank and completely underlying the lading, thereby to efficiently heat the entire contents of the tank.

Another object of the invention is to provide a hot plate that is of novel construction and capable of being manufactured and maintained at low cost.

Another object is to provide a heating means, within a tank, that of itself provides the proper sloping surfaces for efficient and complete drainage of the tank lading.

Another object of the invention is to provide a heating system which presents a minimum of interference with cleaning the interior of the tank as may be required.

Other objects of the invention not specifically mentioned here will be apparent from the detailed description and claims which follow, reference being had to the accompanying drawings in which a preferred embodiment of the invention is shown by way of example and in which:

Fig. 1 is a plan view of a tank whose shell is cut away on the horizontal diameter to show particularly the heating apparatus applied therein;

Fig. 2 is an elevational view in cross section, taken substantially along the line 2—2 of Fig. 1, looking in the direction of the arrows;

Fig. 3 is a cross sectional view taken substantially along the line 3—3 of Fig. 1, looking in the direction of the arrows;

Fig. 4 is a fragmentary cross sectional view taken substantially along the line 4—4 of Fig. 1, looking in the direction of the arrows and drawn to an enlarged scale;

Fig. 5 is a fragmentary cross sectional view taken substantially along the line 5—5 of Fig. 1, looking in the direction of the arrows and drawn to an enlarged scale; and Fig. 6 is a fragmentary cross sectional view taken substantially along the line 6—6 of Fig. 4, looking in the direction of the arrows.

Tanks having a cylindrical body and horizontally disposed are commonly used in tank cars and also as storage tanks. Many liquids, such as petroleum products, asphalt, molasses, etc., which are frequently stored and shipped in tanks of this kind, become so viscous at normal temperatures that it is difficult, if not impossible, to drain the liquid out of such a tank without first heating the liquid to increase its fluidity.

Heating systems for tanks of this kind have been used in the prior art of which we are aware. Usually these systems consist of a series of coils disposed in juxtaposition to the tank shell and usually follow the general contour of the shell. These coils extend substantially from end to end of the tank and sometimes are disposed along the bottom and also sides of the shell through points at or above the horizontal diameter of the shell. A heating medium, usually steam, is circulated through the coils, thereby raising the temperature of the contents of the car to a point where these contents will flow out through the usual discharge ports located in the bottom of the tank.

Heating coils located along the bottom of a tank of this kind seriously interfere with cleaning of the tank and fail to furnish sufficient heat to the bottom of the tank to effect complete draining of the contents therefrom. In fact, it often happens that small congealed mounds of the lading are found adhering to the floor of the tank between the heating coils. The present invention seeks to remedy this condition.

In the preferred embodiment of the invention, the bottom of the tank is equipped with a hot plate disposed in juxtaposition to the shell and extending from end to end thereof. This hot plate is spaced away from the shell of the tank and is in effect a false bottom with a passageway or passageways between the plate and the shell. The center section of the plate is preferably formed as a channel or trough which slopes from high points at the extreme ends of the tank to low points adjacent the discharge port, and the side sections of the hot plate slope towards this channel or trough. The upper surfaces of the plate are smooth and free of obstructions which will interfere with a thorough cleaning of the tank.

Located above the hot plate and on either side of the tank shell are coils that extend from end to end of the tank. Inlet connections to the uper ends of these coils are preferably extended through the loading dome at the top of the tank, and outlet connections from the coils lead to the passageway between the hot plate and the bottom of the shell. A heating medium flowing through the coils and passageway efficiently heats the contents of the tank so that these contents will flow through the discharge port and out of the tank.

There are a number of ways in which the hot plate of the present invention may be made: preferably, however, it is formed of a series of angles extending longitudinally of the tank and positioned with one leg of the angle disposed substantially horizontally, and the other leg disposed substantially vertically. Welds connect the two legs of the outermost angles to the shell of the tank and the legs of the intervening angles to the shell and adjacent outer angle respectively. The substantially vertical legs of the angle are cut away to provide an opening between the passageways formed beneath adjacent angles, and baffles are used to further direct the flow of the heating medium so that it follows a tortuous path or labyrinth beneath the hot plate.

The heating medium enters the top of the tank directly above the outlet port and flows downwardly and outwardly to the coils, thence through the coils into the labyrinth and out of the tank at the center thereof. This arrangement insures a melted core of the lading directly below the dome of the tank and directly above the discharge port so that any pressure that may develop through heating of the lading may be relieved through the dome. This melted core above the lading discharge port facilitates commencing the discharge flow of the lading. Preferably the lading discharge duct is equipped with a jacket into which the discharge ducts from the labyrinth conduct the heating medium so that this duct is also heated to facilitate discharge of the lading. Suitable outlet connections are provided to remove the heating medium from this jacket.

Referring now to the drawings in more detail, the tank shown by way of example consists of a cylindrical shell 1 that is disposed with its longitudinal axis horizontal and equipped with curved end plates 2 and 3, and with a dome structure 4 in the manner of the ordinary tank car. The particular details of construction of the tank itself form no part of the present invention.

Located within the tank are coils 5 and 6 having inlet pipes 7 and 8 respectively, extending upwardly through the shell and dome 4 to connections 9 and 10, through which a heating medium may be introduced into the coil. The outlet ends of the coils 5 and 6 are located at the bottom thereof and lead to hot plate 11, as will presently appear.

As will be seen best in Fig. 4, coils 5 and 6 are mounted upon the interior surface of the shell 1 of the tank by suitable footings 12 that are welded or otherwise fixed to the shell, and upon which a coil cradle 13 is mounted. The individual loops of the coil are attached to this cradle by straps or loops 14 that partially encircle the coil and are attached to the cradle preferably by welding.

In the embodiment shown, and with particular reference to Figs. 1, 3, and 4, the hot plate 11 consists of a series of angles, the outer ones 15 of which have a longer, substantially horizontal upper leg, and a shorter, substantially vertical leg, both of which are attached to the inside surface of the shell, preferably by welds 16. These outer angles extend from end to end of the tank and are also welded to the ends 2 and 3 thereof by welds 17. This angle thus forms with the shell a passageway 18 of triangular section that extends from end to end of the tank.

Located adjacent to these outer angles 15 are second angles 20 similarly disposed and having upper substantially horizontal legs that are welded to the angles 15 by welds 21, and substantially vertical legs that are welded to the shell by welds 22. The angles 20 are also attached to the ends 2 and 3 of the tank by welds 23, and enclosing with the shell a second passageway 24 extending from end to end of the tank.

As will be seen in Fig. 5, the vertical legs of the angles 15 are cut away at points adjacent the junction of sections 1 and end sections 2 and 3 of the shell to form a passageway 25 which connects together the pasageways 18 and 24.

Located alongside of angles 20 are angles 30 which, like the angles 15 and 20, have a substantially horizontal portion which is attached to the vertical portions of the angles 20 by suitable welds. The horizontal portions of the angles 30 do not extend from end to end of the tank, but rather extend from the ends to points near the middle of the tank, these substantially horizontal portions being sloped from high points at the ends 2 and 3 of the tank, to low points near the middle. The vertical portions of the angles 30 are welded to the inside surface of the shell by suitable welds 31 as before.

The adjacent edges of the angles 30 are connected together by a substantially horizontal flat plate 35 by suitable welds, this plate also being welded to the ends 2 and 3 of the tank. The plate slopes with angles 30 from high points adjacent these ends to a low point adjacent the middle of the tank.

As will be seen in Figs. 1, 2, 3, and 4, the lower or discharge end of the coils 5 and 6 connect to the substantially horizontal legs of the angles 15 at points near the middle of the tank so that a heating medium flowing out of the coils will enter the passageway 18 at a point near the middle thereof, the medium being free to flow in two directions to the ends of the tank where it passes through passageways 25, as indicated by the dotted arrows in Fig. 1, into the passageway 24 beneath the angle 20. As will be seen in Figs. 1 and 6, the passageways 24 are blocked near the middle of the tank by a baffle 36 which is welded to the shell 1 and to the legs of the angles 20. The vertical leg of the right-hand angle (Fig. 1) is cut away adjacent the baffle 36 to form a pasageway 37, which passageway leads to a transfer duct formed by generally triangular angles 38 having substantially horizontal legs welded to the angles 20 and 30, and substantially vertical legs welded to the shell. The angles 20 and 30 at the left of the baffle 36 (Fig. 1) are also equipped with passageways 39 leading to transfer ducts 40 that are formed of similar generally triangular angles.

The heating medium traveling in the duct 24 towards the center of the hot plate is thus allowed to flow into the spaces 41 beneath the angles 30, and to flow therethrough towards the ends of the tank. The vertical legs of the angles 30 are cut away at points adjacent the end walls 2 and 3 of the shell to form ports leading into the passageway beneath plates 35 in a manner similar to that shown in Fig. 5, thus permitting the medium from the two passageways 41 at each end of the tank to flow into the single passageway 42 beneath the plates 35. End plates 43 block these passages 42 at the center of the tank, and the medium is drained out of the passageways 42 and out of the shell of the tank through suitable connections 50 (Fig. 2).

In order to drain the lading of the tank out of the shell 1, a jacketed outlet duct 51 is employed, this duct having a flangelike upper plate 52 that is attached to the shell 1 of the tank by suitable means, such as rivets, the plate 52 surrounding a central pipe 53 that leads through the discharge port into the interior of the tank. The pipe 53 is jacketed by a suitable member 54 that forms a space 55 into which the connections 50 lead to conduct the heating medium thereto.

The medium is drained out of the space 55 through suitable connections 56.

Thus it will be seen that the heating system of the present invention consists of a hot plate located in the bottom of the tank and extending from end to end thereof, having a central channel or trough formed by sloping members 30 and 35, and that the side sections of the plate formed by angles 15 and 20 slope gradually toward this trough or channel. Located above and on either side of the hot plate are coils which are similar to the heating coils used in the prior art of which we are aware, these coils and the passageways beneath the hot plate being connected together in series. The hot plate, being a false bottom in the tank, applies heat to the very bottom of the lading and it has been found that this arrangement heats the lading more quickly and more efficiently than has been possible heretofore. In one instance, the time required to heat a tank preparatory to discharging a lading of petroleum wax was reduced from twenty-four to seven hours with this arrangement. Since the lading is more thoroughly and uniformly heated, a more complete discharge is achieved. The sloping troughlike channel in the center of the hot plate further facilitates complete drainage of the tank.

In the operation of the heating system when the tank contains a liquid which must be heated before it can be removed, the heating medium is connected to the inlet connections 9 and 10 through suitable valves, not shown; and suitable drains are connected to the outlet connections 56, also through valves, not shown, if desired. The heating medium, usually steam, is admitted to the coils 5 and 6, where it will be condensed into water which will flow out of these coils and into the passageways beneath the hot plate, thence down through the jacketed drain and out of the heating system through outlet connections 56.

If the valves connected to the connections 56 are left wide open, and the valves connected to the inlet connections 9 and 10 are likewise widely opened so that the full pressure of the steam is available, the contents of the car will be heated rapidly and eventually may reach a temperature sufficiently high that the steam will not be condensed either in the coils or under the hot plate or in the passageway 55, but rather will flow through the entire heating system as steam. This may result in heating the contents of the car unduly, and the flow of steam can be regulated by adjustment of the inlet or outlet valves, or both, so that a lower consumption of steam will result and there will be less heat delivered to the contents.

Tanks must be cleaned at regular intervals, and when this operation becomes necessary thorough cleaning may be readily accomplished since the hot plate is of itself flat and smooth and it is capable of being easily scraped or scrubbed as may be required. The coils 5 and 6, and cradles and mountings by which they are secured to the tank shell are arranged so as to interfere as little as possible with such a cleaning operation. If desired or necessary, the coils and hot plate may be heated moderately during this operation.

While the formation of the hot plate through the use of angles as above explained is preferable and affords a relatively inexpensive method of forming the hot plate, the invention is not limited to the use of angles. If desired, the vertical and horizontal legs of the various angles may of themselves be separate pieces welded together simultaneously with the welding of the adjacent members thereto.

Thus it will be seen that the heating system of the present invention possesses many advantages. It is of sturdy construction throughout and not likely to become defective in ordinary use. It may be cheaply constructed and maintained economically. Heat is efficiently applied to the contents throughout the bottom area thereof to facilitate attaining complete discharge of the lading, and there is a minimum of interference with cleaning operations within the tank.

While we have chosen to show our invention by illustrating and describing a preferred embodiment of it, we have done so by way of example only as there are many modifications and adaptations which can be made by one skilled in the art within the teachings of the invention.

Having thus complied with the statutes, and shown and described a preferred embodiment of the invention, what we consider new and desire to have protected by Letters Patent is pointed out in the appended claims.

What is claimed is:

1. A heating system for a tank having a horizontally disposed cylindrical shell comprising: a hot plate disposed in the bottom of the tank and extending from end to end thereof, said hot plate having a channel centered on the longitudinal median line of the tank and sloping from high points at the ends of the tank to a low point at the center thereof, a labyrinth between said hot plate and the bottom of the shell on each side of the longitudinal median line of the shell, heating coils extending from end to end of the shell and disposed in juxtaposition to the sides of said shell and above said hot plate, inlet connections at the upper ends of said coils, connections between the lower ends of said coils and said labyrinths, and outlet connections leading from said labyrinths out of the tank to permit a heating medium to pass through said coils and labyrinths thereby to heat said hot plate and the contents of the tank to facilitate draining the contents from the tank.

2. A heating system for a tank having a horizontally disposed cylindrical shell comprising: a hot plate disposed in the bottom of the tank and extending from end to end thereof, said hot plate having a channel centered on the longitudinal median line of the tank and sloping from high points at the ends of the tank to a low point at the center thereof, a labyrinth between said hot plate and the bottom of the shell on each side of the longitudinal median line of the shell, heating coils extending from said hot plate upwardly adjacent the inside surface of the shell of the tank to approximately the horizontal diameter of the shell, inlet connections at the upper ends of said coils, connections between the lower ends of said coils and said labyrinths, and outlet connections leading from said labyrinths out of the tank to permit a heating medium to pass through said coils and labyrinths thereby to heat said hot plate and the contents of the tank to facilitate draining the contents from the tank.

3. A heating system for a tank having a horizontally disposed cylindrical shell comprising: a hot plate disposed in the bottom of the tank and extending from end to end thereof, said hot plate having a channel centered on the longitudinal median line of the tank and sloping from high points at the ends of the tank to a low point at the center thereof, side sections of said hot plate sloping transversely of the tank towards said channel, an outlet pipe leading out of the tank from said low point to facilitate draining of the contents from the tank, a labyrinth between said hot plate and the bottom of the shell, pipe coils extending from the middle of the shell and near the horizontal diameter thereof horizontally towards one end of the tank and thence horizontally to the other end thereof in a plurality of loops the last of which connects to said labyrinth at the side sections of said hot plate and near the transverse median line of said shell, a heating jacket for said outlet pipe, connections leading out of said labyrinth at the low point of said channel and into said jacket, inlet connections at the upper ends of said coils, and outlet connections leading out of said jacket to permit a heating medium to pass through said coils, labyrinth, and jacket, thereby to heat the contents of the tank, said hot plate and outlet pipe to facilitate draining the contents from the tank.

4. In a heating system for a tank that has a horizontally disposed cylindrical shell and a discharge duct located in the bottom of the shell near the transverse median line thereof, a hot plate located in the bottom of the shell and extending from end to end thereof and spaced a short distance thereabove, coils extending from end to end of the shell along the inside surface thereof and disposed along that surface and between the outer edges of said hot plate and the horizontal diameter of the shell, outlet connections for said coils leading into the space between said hot plate and the bottom of the shell at points near the transverse median line of the tank, inlet connections for said coils extending from the upper ends thereof inwardly along said transverse median line and thence upwardly and out of the shell at the top thereof, said coils and connections being adapted to conduct a heating medium through the tank and into the space between the hot plate and the bottom of the shell to heat the contents of the tank, said inlet connections insuring rapid heating of a core of the material immediately above said discharge duct, and means for draining said heating medium out of the space beneath said hot plate.

5. In a heating system for a tank that has a horizontally disposed cylindrical shell and a discharge duct located in the bottom of the shell near the transverse median line thereof; a pair of coils within said shell, one on each side of said median line, disposed adjacent the horizontal diameter of the shell and extending downwardly therefrom and from end to end of the shell; a hot plate covering the bottom portion of the shell from end to end of the shell; baffle means disposed between said hot plate and the shell for forming a labyrinth therebetween; connections between said coils and said labyrinth adjacent the transverse median line of the shell, heating medium passing through each coil flowing through parallel paths in the labyrinth, with one path extending back and forth between said median line and one end of the shell and the other path extending back and forth from said median line and the other end of the shell; a jacket surrounding said discharge duct; connections from said labyrinth paths to said jacket for conducting the heating medium from the paths into the jacket; and a duct leading out of the jacket for conducting said medium out of the system.

6. In a tank having a horizontally disposed cylindrical shell, an inner bottom plate composed of: a pair of angles disposed one on each side of the longitudinal median line of the shell and extending from end to end thereof with one leg disposed substantially horizontally but sloping towards said median line and with the other leg disposed substantially vertically, said vertical legs containing cut-away portions at the ends of the shell; welds securing and sealing said legs to said shell; a second pair of similarly disposed angles alongside said first pair of angles; welds securing the horizontal legs of said second angles to the vertical legs of the first angles and the vertical legs of the second angles to the shell, said latter legs containing cut-away portions at the center of the shell; a third pair of angles disposed on each side of said median line against said second pair of angles, the vertical legs of said third of angles being tapered so that the horizontal legs thereof slope from high points at the ends of the shell to low points in juxtaposition to the transverse median line of the shell and containing cut-away portions at the ends of the shell; welds fixing said third angles to the second angles and to the shell; cover plates welded between said third angles in the planes of the horizontal legs thereof; end plates welded between the ends of said third angles and cover plate and the shell; baffles welded between the second angles and shell at the centers of the angles to form a labyrinth between the inner bottom and shell; a drain pipe leading out of said shell adjacent the transverse center thereof; a jacket surrounding said drain pipe; fluid conducting connections leading from the labyrinth beneath said cover plates into said jacket; an outlet pipe leading out of said jacket; a pair of heating coils one on each side of said shell disposed above said inner bottom and extending from end to end of the shell; inlet connections at the tops of said coils; outlet connections leading from the coils into said labyrinth at the center of the shell and beneath said first angles so that a heating median may flow through the coils, labyrinth and jacket to melt the contents of the tank, facilitating draining the tank through the drain pipe with the contents draining over the unobstructed and sloping surfaces of said inner bottom.

REA W. THOMPSON.
ARTHUR H. GRAHAM.

REFERENCES CITED

The following references are of record in the file of this patent:

UNITED STATES PATENTS

| Number | Name | Date |
| --- | --- | --- |
| 1,118,514 | Smith | Nov. 24, 1914 |
| 1,633,271 | Pauly | June 21, 1927 |
| 1,685,131 | Hummer | Sept. 25, 1928 |
| 1,706,052 | Auchincloss | Mar. 19, 1929 |
| 2,145,614 | Stambaugh | Jan. 31, 1939 |

FOREIGN PATENTS

| Number | Country | Date |
| --- | --- | --- |
| 484,953 | Great Britain | May 12, 1939 |
| 635,970 | Germany | Oct. 1, 1936 |